United States Patent
Hemmati et al.

(10) Patent No.: US 10,914,052 B1
(45) Date of Patent: Feb. 9, 2021

(54) SYSTEMS AND METHODS FOR LAYING UNDERGROUND FIBER OPTIC CABLE

(71) Applicant: Facebook, Inc., Menlo Park, CA (US)

(72) Inventors: Hamid Hemmati, Los Angeles, CA (US); Hamidreza Bolandhemmat, Los Angeles, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/934,716

(22) Filed: Jul. 21, 2020

Related U.S. Application Data

(60) Provisional application No. 62/878,152, filed on Jul. 24, 2019.

(51) Int. Cl.
| | |
|---|---|
| *E21B 7/04* | (2006.01) |
| *E02F 5/04* | (2006.01) |
| *H02G 9/00* | (2006.01) |
| *G02B 6/50* | (2006.01) |
| *E02F 3/06* | (2006.01) |
| *G02B 6/54* | (2006.01) |
| *E02F 5/14* | (2006.01) |

(52) U.S. Cl.
CPC .................. *E02F 5/04* (2013.01); *E02F 3/06* (2013.01); *E02F 5/145* (2013.01); *E21B 7/04* (2013.01); *G02B 6/504* (2013.01); *G02B 6/54* (2013.01); *H02G 9/00* (2013.01)

(58) Field of Classification Search
CPC .......................................................... E21B 7/04
USPC ................ 405/174–176, 184; 175/45, 61–62
See application file for complete search history.

(56) References Cited

U.S. PATENT DOCUMENTS

| | | | | |
|---|---|---|---|---|
| 1,388,545 | A | * 8/1921 | Bohan ...................... | F42B 23/00 175/19 |
| 3,597,680 | A | * 8/1971 | Haddon .................... | G01V 3/15 324/326 |
| 4,098,089 | A | * 7/1978 | Zaslavsky ................ | E02B 3/00 405/174 |
| 4,700,788 | A | * 10/1987 | Langner .................... | E21B 4/18 175/61 |
| 5,720,354 | A | * 2/1998 | Stump ...................... | G01V 1/42 175/26 |
| 5,836,406 | A | * 11/1998 | Schuh ...................... | E21B 7/062 175/61 |
| 2009/0301779 | A1 * | 12/2009 | Bick ........................ | E21B 7/26 175/45 |

* cited by examiner

*Primary Examiner* — Sunil Singh
(74) *Attorney, Agent, or Firm* — FisherBroyles, LLP

(57) ABSTRACT

The disclosed systems for laying underground fiber optic cable may include a drive body, at least one rotational motor, a forward auger element rotatably coupled to the drive body and positioned to be rotated by the at least one rotational motor in a first rotational direction, and a rear auger element rotatably coupled to the drive body and positioned to be rotated by the at least one rotational motor in a second, opposite rotational direction. Various other systems, methods, and devices are also disclosed.

20 Claims, 11 Drawing Sheets

SYSTEMS AND METHODS FOR LAYING UNDERGROUND FIBER OPTIC CABLE

CROSS-REFERENCE TO RELATED APPLICATION

This application claims the benefit of U.S. Provisional Patent Application No. 62/878,152, titled "SYSTEMS FOR LAYING UNDERGROUND FIBER OPTIC CABLE," filed Jul. 24, 2019, the entire disclosure of which is incorporated herein by reference.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
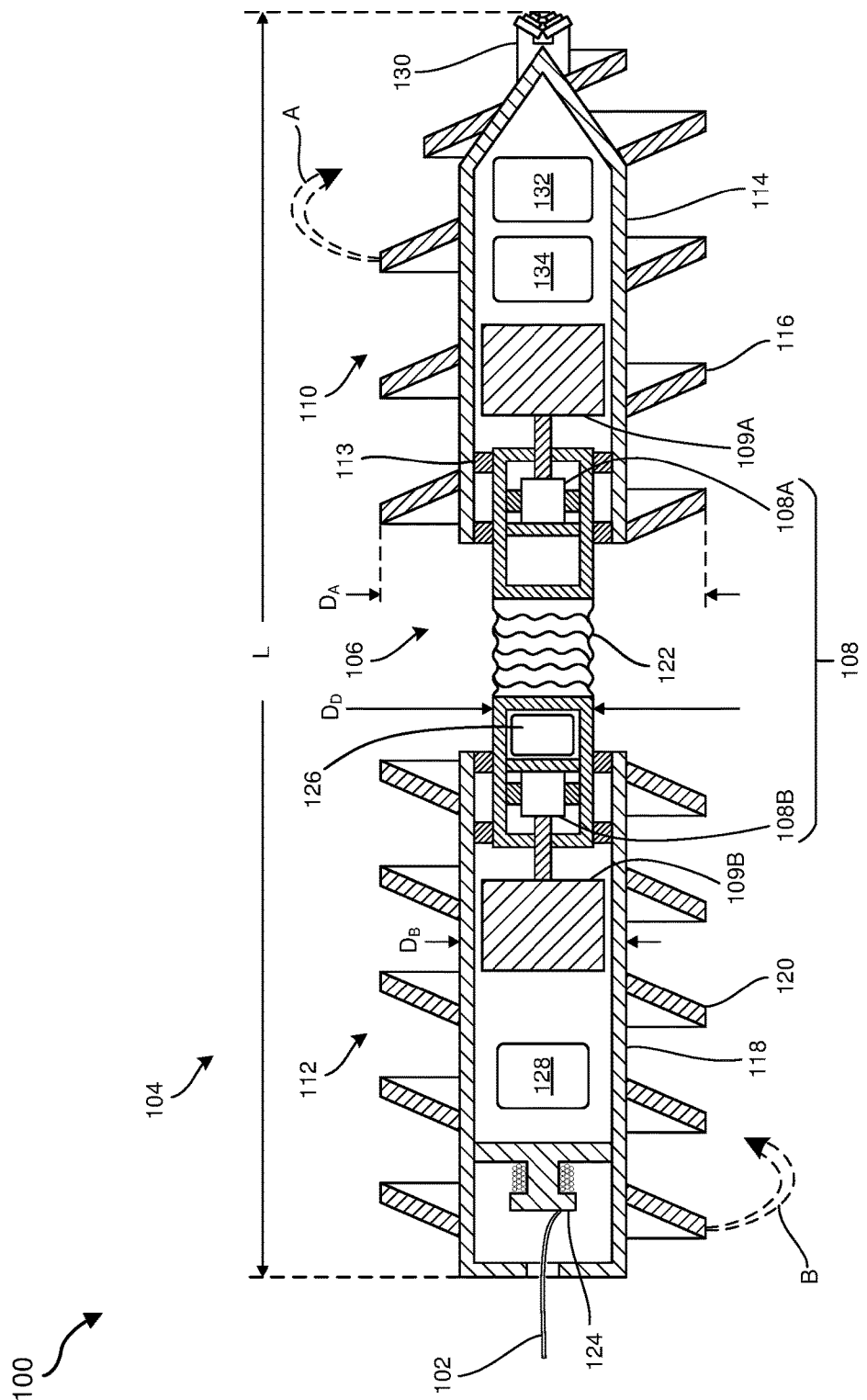
FIG. 1 is a cross-sectional side view of a system for laying underground fiber optic cable, according to at least one embodiment of the present disclosure.

While the example embodiments described herein and in the drawings are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within this disclosure. The drawings are not necessarily to scale and may be considered schematic representations of the embodiments described herein.

DETAILED DESCRIPTION OF EXAMPLE EMBODIMENTS

As the demand for electronic communications grows, improved communication infrastructure is required to meet demand. Optical fibers conventionally provide high-speed and generally reliable electronic communication. Fiber optic cables may be positioned above-ground, such as via utility poles. However, utility poles and associated cables may be obtrusive and are subject to wear or destruction by weather events or other accidents. Therefore, many communities require new fiber optic cables to be installed underground.

The laying of underground fiber optic cables conventionally involves the use of large and expensive machinery and/or significant manpower. For example, in some cases trenches are formed and fiber optic cables are laid in the trenches. In other cases, a directional drilling machine may be used to drill a hole in which fiber optic cable may be laid. In any case, the machinery and/or process may result in blockage and sometimes closure of roads. In addition, conventional methods for laying underground fiber optic cables often take a significant period of time to complete.

The present disclosure is generally directed to systems and methods for laying underground fiber optic cables. In some embodiments, the present disclosure may include a robotic (e.g., remotely operated, autonomous, or partially autonomous) system that includes a drive body, at least one rotational motor positioned within the drive body, a forward auger element rotatably coupled to the drive body and positioned to be rotated by the at least one rotational motor in a first rotational direction, and a rear auger element rotatably coupled to the drive body and positioned to be rotated by the at least one rotational motor in a second, opposite rotational direction.

In some examples, the system may operate autonomously (e.g., without the need for involvement of an operator during a drilling operation). For example, the system may be initially supplied with global positioning system ("GPS") coordinates for the desired starting and end points. The system may use this information to autonomously proceed from the starting point to the end point without further instructions.

In some embodiments, the rotational motor(s) may include a first rotational motor that is configured to rotate the forward auger element in the first rotational direction and a second rotational motor that is configured to rotate the rear auger element in the second, opposite rotational direction. The drive body may include one or more flexible junctions positioned between the rotational motors, such as to facilitate steering of the system underground. A steering mechanism may be included and configured to reorient a direction of underground movement of the system.

In some examples, a subterranean drill bit may be positioned in front of the forward auger element, such as to drill through a subterranean formation (e.g., rock, shale, hard soil, etc.). Optionally, the drilling system may employ a propulsion system (e.g., a drill string) to push the drill forward with sufficient force to pass through underground obstructions.

An object sensor (e.g., a gamma ray sensor, a sonar sensor, etc.) may be positioned and configured to sense obstructions (e.g., rocks, boulders, root systems, pipes, building foundations, etc.) in soil in front of the system. In some examples, the system may include one or more guiding fins and/or one or more drag/friction devices to facilitate steering through the soil. Thus, the system may be configured to steer around sensed obstructions, either autonomously or at the direction of a remote operator. By avoiding obstructions, the system may be kept in soil that is relatively simple and quick to traverse, which may improve a speed of laying the fiber optic cables underground, compared to conventional methods.

In some examples, the term "soil" may refer to any subterranean formation, including without limitation organic matter, minerals, sand, shale, rocks, or any combination thereof.

The system may further include sensors for determining its position and/or orientation, such as an inertial measurement unit (IMU) and/or a GPS receiver. For example, the IMU may include one or more accelerometers and/or gyroscopes. An associated filtering algorithm may be used to assist in finding the position and/or orientation of the system during operation, guidance, control, and/or movement of the system.

In some examples, the system may include a fiber spool mounted on or in the rear auger element. The fiber spool may be configured to release fiber optic cable behind the system as the system proceeds underground. Alternatively or additionally, the system may include a flexible conduit spool and may be configured to release flexible conduit behind the system as the system proceeds underground.

A battery power source for supplying power to the at least one motor may be positioned within at least one of: the drive body, the forward auger element, and/or the rear auger element. In additional embodiments, a power source may include a power supply cable extending from the rear auger element to an above-ground power element.

In some examples, the system may include a communication interface (e.g., a wireless or wired communication interface) that is configured to enable electronic communication between the system and a remote operator.

The following will provide, with reference to FIGS. 1-10, detailed descriptions of various example systems and devices for laying underground fiber optic cable. With reference to FIG. 11, the following will provide detailed descriptions of example methods for laying underground fiber optic cable.

FIG. 1 is a cross-sectional side view of a system 100 for laying underground fiber optic cable 102, according to at least one embodiment of the present disclosure. The system 100 may include an underground drilling device 104 that is configured to lay the fiber optic cable 102 in soil as the underground drilling device 104 proceeds through the soil.

The underground drilling device 104 may include a drive body 106 and at least one rotational motor 108 at least partially positioned within the drive body 106. For example, the at least one rotational motor 108 may include a first rotational motor 108A and a second rotational motor 108B. Alternatively, the at least one rotational motor 108 may be a single rotational motor with two outputs that are configured to be rotated in opposite rotational directions (e.g., respectively clockwise and counterclockwise).

A forward auger element 110 may be rotatably coupled to a forward side of the drive body 106 and a rear auger element 112 may be rotatably coupled to a rear side of the drive body 106. For example, roller bearings 113 may rotatably couple the drive body 106 to the forward auger element 110 and to the rear auger element 112.

The forward auger element 110 may be positioned and configured to be rotated by the first rotational motor 108A (or a first output of a single rotational motor) in a first rotational direction A (e.g., counterclockwise, when viewed from a front of the underground drilling device 104). The forward auger element 110 may include a forward cylindrical body 114 and a forward helical fin 116 extending radially outward from the forward cylindrical body 114. The forward helical fin 116 may be a single continuous element or may include two or more segments. The forward helical fin 116 may have a shape that urges the underground drilling device 104 forward when the forward auger element 110 is rotated in the first rotational direction A.

The first rotational motor 108A may include a corresponding first output shaft 109A for driving rotation of the forward auger element 110. The first output shaft 109A may be engaged with an inner surface of the forward cylindrical body 114 to drive rotation of the forward cylindrical body 114 relative to the drive body 106 when the first rotational motor 108A is activated. By way of several examples, the first output shaft 109A may be frictionally engaged with the inner surface of the forward cylindrical body 114, gear teeth of the first output shaft 109A may be intermeshed with corresponding gear teeth on the inner surface of the forward cylindrical body 114, the first output shaft 109A may be welded, adhered, or otherwise rigidly coupled to the forward cylindrical body 114, etc.

The rear auger element 112 may be positioned and configured to be rotated by the second rotational motor 108B (or a second output of a single rotational motor) in a second, opposite rotational direction B (e.g., clockwise, when viewed from a front of the underground drilling device 104). The rear auger element 112 may include a rear cylindrical body 118 and a rear helical fin 120 extending radially outward from the rear cylindrical body 118. The rear helical fin 120 may be a single continuous element or may include two or more segments. The rear helical fin 120 may have a shape that urges the underground drilling device 104 forward when the rear auger element 112 is rotated in the second rotational direction B.

The second rotational motor 108B may include a corresponding second output shaft 109B for driving rotation of the rear auger element 112. The second output shaft 109B may be engaged with an inner surface of the rear cylindrical body 118 to drive rotation of the rear cylindrical body 118 relative to the drive body 106 when the second rotational motor 108B is activated. By way of several examples, the second output shaft 109B may be frictionally engaged with the inner surface of the rear cylindrical body 118, gear teeth of the second output shaft 109B may be intermeshed with corresponding gear teeth on the inner surface of the rear cylindrical body 118, the second output shaft 109B may be welded, adhered, or otherwise rigidly coupled to the rear cylindrical body 118, etc.

Rotating the forward auger element 110 and the rear auger element 112 in respectively opposite directions A and B may facilitate a canceling out of resultant motor torque when the first and second rotational motors 108A, 108B are simultaneously operated. The rear auger element 112 may act as an anchor against which the first rotational motor 108A and the forward auger element 110 may push to rotate, and the forward auger element 110 may act as an anchor against which the second rotational motor 108B and the rear auger element 112 may push to rotate. This configuration and operation may enable the underground drilling device 104 to proceed forward through the soil.

The drive body 106, forward cylindrical body 114, forward helical fin 116, rear cylindrical body 118, and rear helical fin 120 may each include a material that has a suitable hardness, abrasion resistance, and durability for exposure to and drilling through a subterranean formation, such as soil, rocks, sand, etc. By way of example and not limitation, the material included in these components may be or include a steel material (e.g., a steel casting, a steel forging, a machined steel, etc.), hard particles (e.g., tungsten carbide) infiltrated with a metal alloy binder, a sintered carbide material, a boride material, etc.

In some examples, the drive body 106 may include a flexible junction 122 to facilitate turning the underground drilling device 104, such as to avoid an underground obstruction and/or to reach a desired end point. For example, the flexible junction 122 may enable the forward auger element 110 to be angled (e.g., misaligned) relative to the rear auger element 112. The flexible junction 122 may be configured to exhibit torsional stiffness and bending flexibility. Steering of the underground drilling device 104 may be accomplished by, for example, driving rotation of the first rotational motor 108A and second rotational motor 108B at different speeds or torques and/or by activating a steering mechanism, such as will be described below with reference to FIGS. 6 and 7.

As illustrated in FIG. 1, the underground drilling device 104 may include a spool 124 (e.g., a fiber spool, a flexible conduit spool, etc.) mounted on or in the rear auger element 112. For example, the spool 124 may be implemented as a fiber spool configured to release the fiber optic cable 102 behind the system 100 as the system 100 proceeds underground. In additional examples, the spool 124 may be implemented as a flexible conduit spool configured to release flexible conduit behind the system 100 as the system 100 proceeds underground. After the flexible conduit is in position underground, the fiber optic cable 102 may be inserted into the flexible conduit. In some embodiments, the flexible conduit may be inflated (e.g., with pressurized air) to provide space for the fiber optic cable 102 to be inserted therein.

The underground drilling device 104 may include a communication interface 126 that may be configured to enable electronic communication between the underground drilling device 104 and a remote operator. For example, the communication interface 126 may be positioned within the drive body 106, within the forward auger element 110, and/or within the rear auger element 112. The communication interface 126 may be configured to facilitate wired and/or wireless communication with the remote operator. In the case of wired communication, the fiber optic cable 102 may be used to provide signals to the communication interface 126 as the fiber optic cable 102 is laid underground by the underground drilling device 104. The remote operator may provide control signals to the underground drilling device 104 via the communication interface 126, such as to instruct the first rotational motor 108A and/or the second rotational motor 108B to rotate, stop rotating, increase a rotational speed, decrease a rotational speed, etc. The remote operator may include a computer that may provide instructions to the underground drilling device 104. The computer of the remote operator may be manually operated, fully automatically operated, or automatically operated after receiving input (e.g., a desired end point for laying the fiber optic cable 102) from a human user.

A battery power source 128 may provide electrical power to the first rotational motor 108A and second rotational motor 108B as well as to other potential electrical components (e.g., sensors, the communication interface 126, etc.). For example, the battery power source 128 may be located in the forward auger element 110, in the rear auger element 112, and/or in the drive body 106. In some examples, the battery power source 128 may include multiple batteries distributed in any combination of the forward auger element 110, rear auger element 112, and/or drive body 106.

Optionally, the underground drilling device 104 may include a subterranean drill bit 130 positioned at a front end of the forward auger element 110. The subterranean drill bit 130 may be configured to drill through (e.g., break up, move, etc.) hard soil, rocks, or other subterranean formations to facilitate movement of the underground drilling device 104 through the soil. The subterranean drill bit 130 may be or include a roller cone drill bit, a drag bit, an auger bit, a hybrid bit, or any other suitable subterranean drill bit 130, as is known in the art of subterranean drilling. The type of subterranean drill bit 130 selected may depend on a type (e.g., hardness) of soil to be drilled through by the underground drilling device 104. The subterranean drill bit 130 is shown schematically in FIG. 1 as having a smaller diameter than the forward cylindrical body 114 of the forward auger element. However, the present disclosure is not so limited. In additional embodiments, the subterranean drill bit 130 may have a diameter that is the same as or larger than the forward cylindrical body 114.

In some embodiments, the underground drilling device 104 may include an onboard ground-penetrating object sensor 132. The object sensor 132 may be positioned and configured to sense obstructions (e.g., boulders, existing infrastructure, compacted soil, etc.) in soil in front of the underground drilling device 104. Upon detecting an obstruction, the underground drilling device 104 may be steered around the obstruction or operated in a manner (e.g., at an appropriate speed) to proceed through the obstruction. The object sensor 132 may include, for example, a gamma ray sensor or a sonar sensor. In additional embodiments, the location of obstructions may be sensed by an aboveground object sensor, as explained below with reference to FIG. 10.

A position and orientation sensor 134 may also be included in the system 100. The position and orientation sensor 134 may be configured to sense a position (e.g., location) and orientation (e.g., lateral angle, rotational angle, etc.) of the underground drilling device 104 or of a portion thereof (e.g., of the drive body 106, forward auger element 110, and/or rear auger element 112). By way of example and not limitation, the position and orientation sensor 134 may include a GPS receiver, an encoder, an inertial measurement unit ("IMU"), an accelerometer, a gyroscope, a fiber Bragg grating location sensor, or any combination thereof or other suitable position and orientation sensor 134.

As illustrated in FIG. 1, the underground drilling device 104 may have a length L. The length L may be between about 50 cm and about 150 cm, such as about 90 cm. The forward helical fin 116 and the rear helical fin 116 may have an outer auger diameter $D_A$. The outer auger diameter $D_A$ may be between about 15 cm and about 45 cm, such as about 30 cm. The forward cylindrical body 114 and the rear cylindrical body 118 may have an outer body diameter $D_B$. The outer body diameter $D_B$ may be less than the outer auger diameter $D_A$ and may be between about 10 cm and about 30 cm, such as about 19 cm. The drive body 106 may have an outer drive diameter $D_D$. The outer drive diameter $D_D$ may be less than the outer drive diameter $D_B$ and may be between about 5 cm and about 20 cm, such as about 12 cm. These dimensions are provided by way of example and not limitation. The underground drilling device 104 may be implemented at various sizes and scales, such as depending on the type and hardness of soil to be drilled through, a length of fiber optic cable to be laid, and other potential factors.

Figure 2:
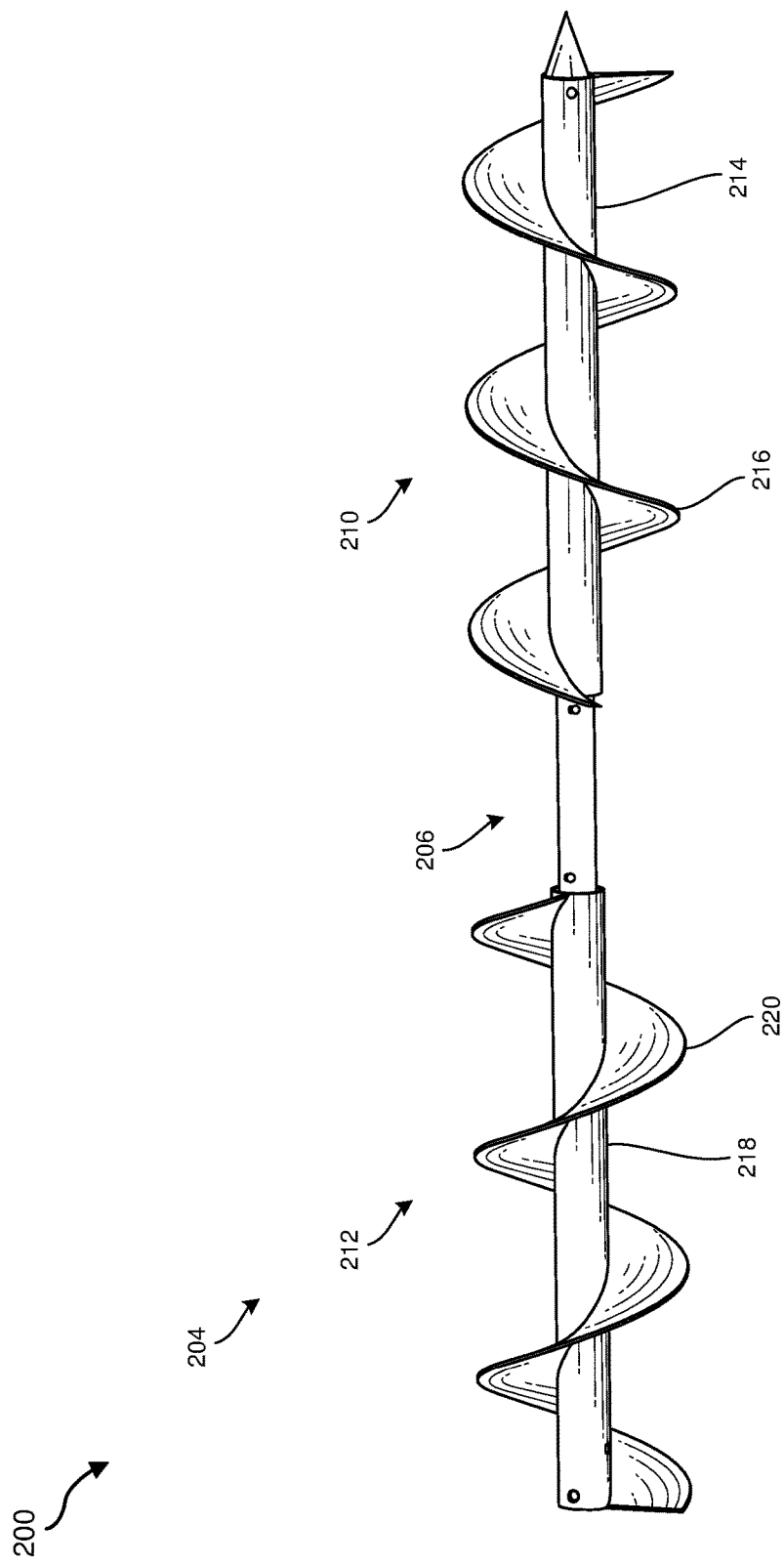
FIG. 2 is a side view of a system for laying underground fiber optic cable, according to at least one additional embodiment of the present disclosure.
Figure 3:
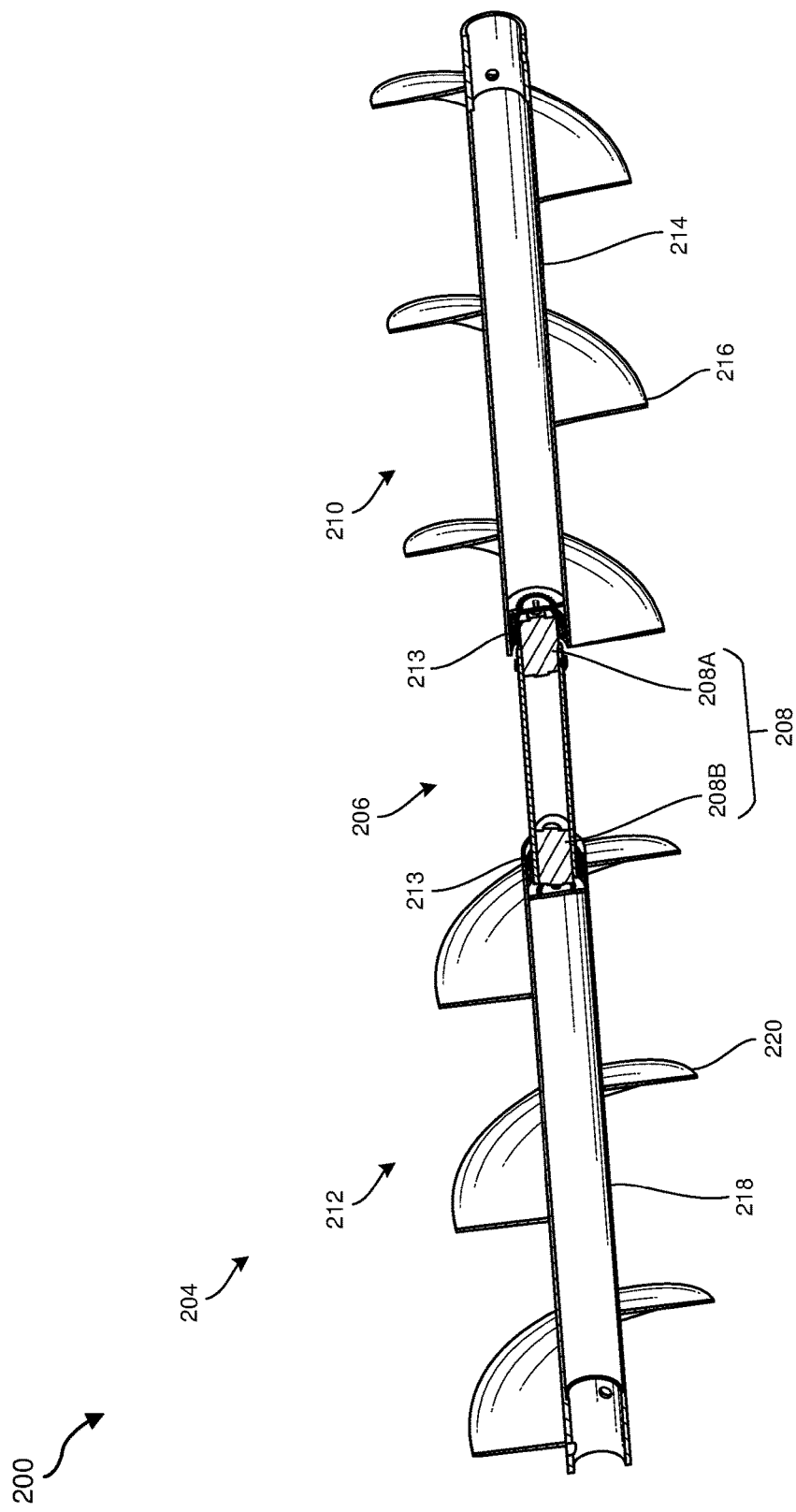
FIG. 3 is a cross-sectional perspective view of the system of FIG. 2.
Figure 4:
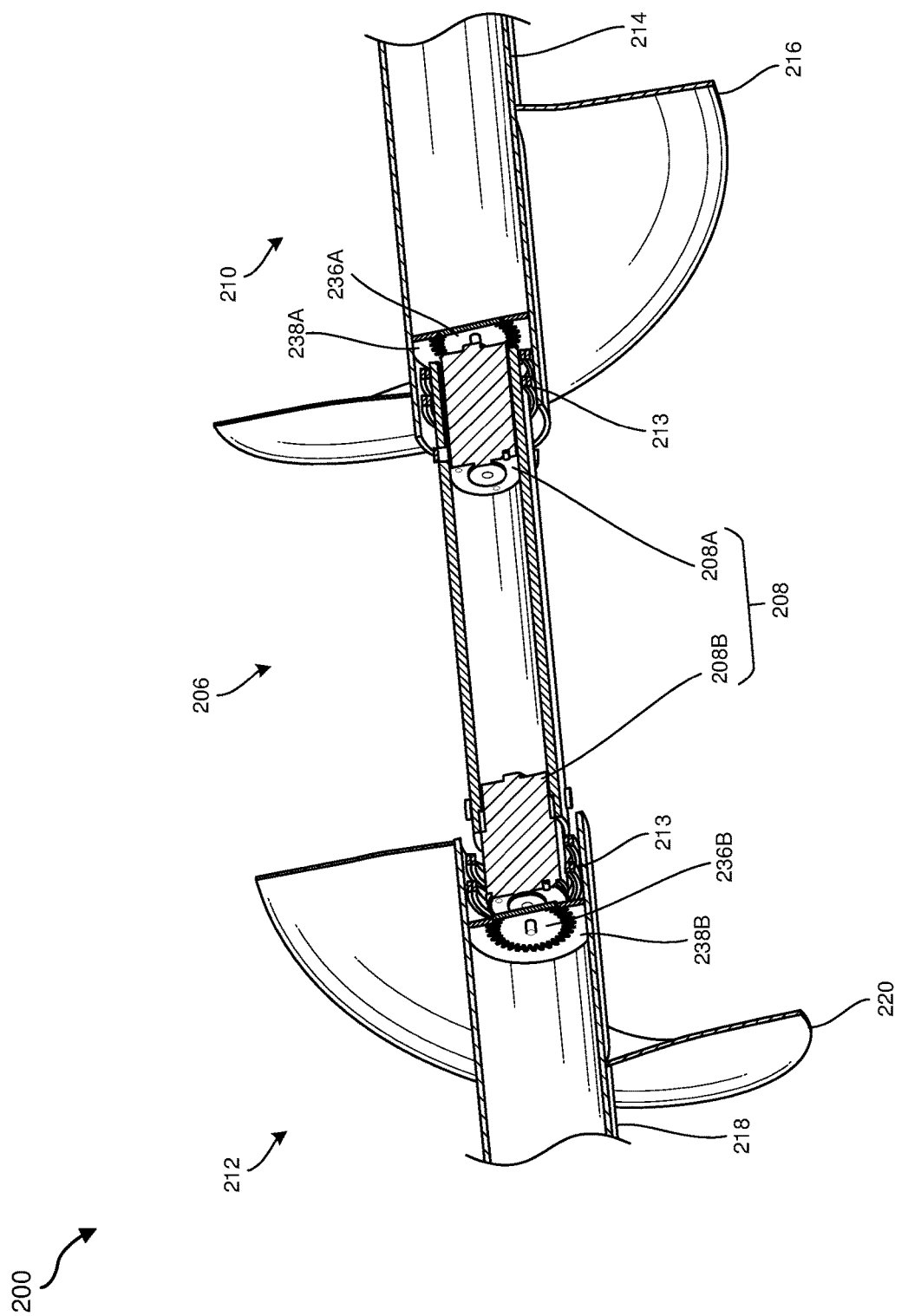
FIG. 4 is a rear cross-sectional perspective view of a portion of the system of FIG. 2.
Figure 5:
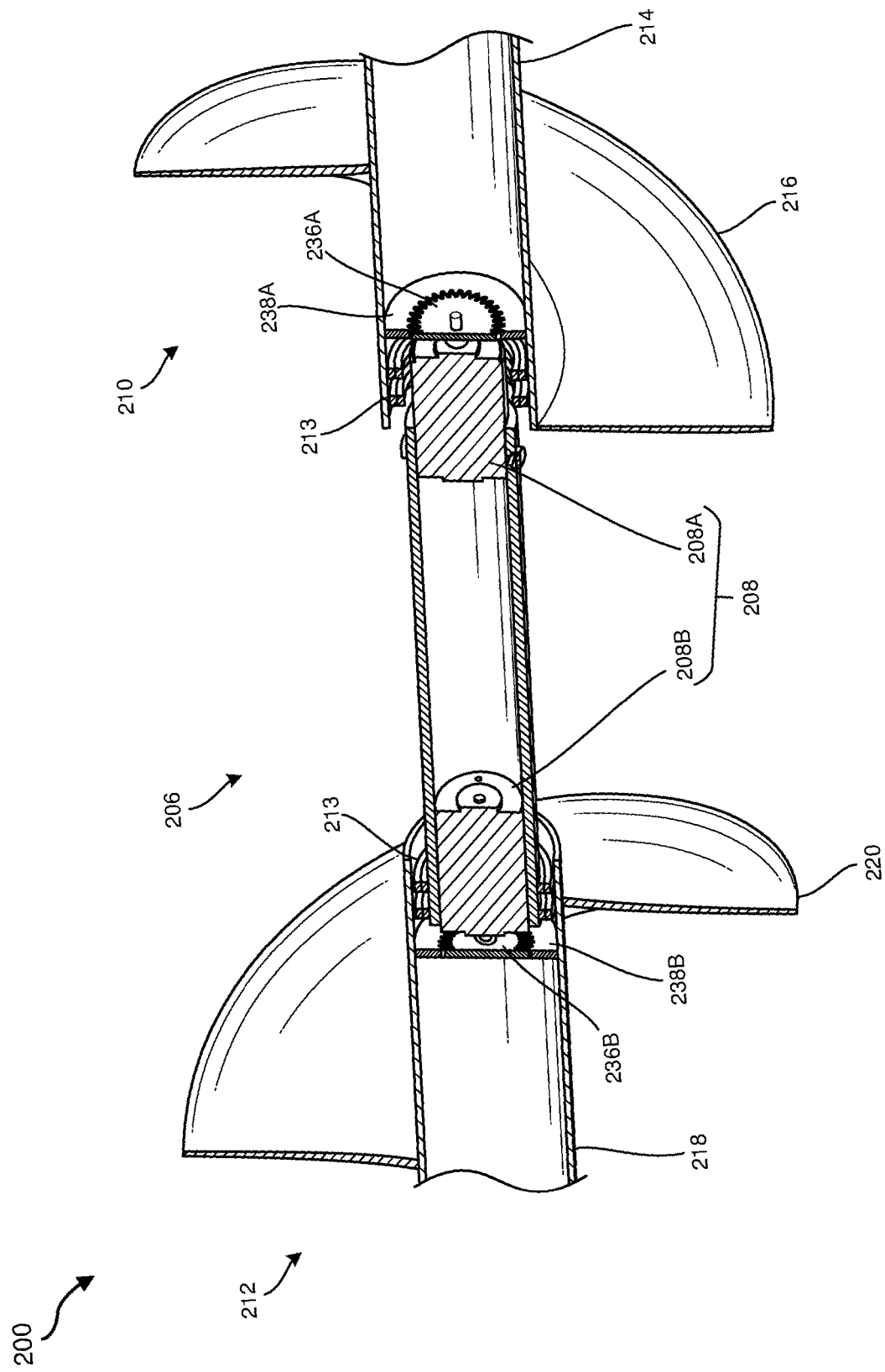
FIG. 5 is a front cross-sectional perspective view of a portion of the system of FIG. 2.

FIG. 2 is a side view of a system 200 for laying underground fiber optic cable, according to at least one additional embodiment of the present disclosure. FIG. 3 is a cross-sectional perspective view of the system of FIG. 2. FIG. 4 is a rear cross-sectional perspective view of a portion of the system of FIG. 2. FIG. 5 is a front cross-sectional perspective view of a portion of the system of FIG. 2.

Referring to FIGS. 2 and 3, In some respects, the system 200 may be similar to the system 100 described above with reference to FIG. 1. For example, the system 200 may include an underground drilling device 204, which may include a drive body 206, a forward auger element 210 rotatably coupled to the drive body 206, and a rear auger element 212 rotatably coupled to the drive body 206. The drive body 206 may house at least one rotational motor 208. The forward auger element 210 may include a forward cylindrical body 214 and a forward helical fin 216 extending radially outward from the forward cylindrical body 214. The forward helical fin 216 may be positioned and configured for rotating the forward auger element 210 in a first direction. The rear auger element 212 may include a rear cylindrical body 218 and a rear helical fin 220 extending radially outward from the rear cylindrical body 218. The rear helical fin 220 may be positioned and configured for rotating the rear auger element 212 in a second, opposite direction.

As illustrated in FIG. 2, in some examples, the forward helical fin 216 and the rear helical fin 220 may each be formed of a single, continuous helical material. As the forward auger element 210 and the rear auger element 212 are counter-rotated within soil, the respective angles of the forward helical fin 216 and the rear helical fin 220 may cause the underground drilling device 204 to progress through the soil in a forward direction (e.g., left to right in the perspective of FIG. 2).

As shown in FIGS. 3-5, the drive body 206 may house at least a portion of a first rotational motor 208A and of a second rotational motor 208B. Bases of the rotational motors 208 may be rigidly coupled to the drive body 206. The bases of the rotational motors 208 and/or the drive body 206 may be rotatably coupled to the respective forward auger element 210 and rear auger element 212, such as via roller bearings 213. The roller bearings 213 may facilitate mutual rotation between the drive body 206 and the forward auger element 210 and rear auger element 212, while maintaining an axial coupling between the drive body 206 and the forward auger element 210 and rear auger element 212.

As illustrated in FIGS. 4 and 5, a first output shaft of the first rotational motor 208A may include a first toothed gear 236A and a second output shaft of the second rotational motor 208B may include a second toothed gear 236B. A complementary first set of internal teeth 238A may be secured (e.g., welded, adhered, press-fit, bolted, integrally formed, etc.) to an inner surface of the forward cylindrical body 214. The first toothed gear 236A may be engaged with the first set of internal teeth 238A. Likewise, a complementary second set of internal teeth 238B may be secured (e.g., welded, adhered, press-fit, bolted, integrally formed, etc.) to an inner surface of the rear cylindrical body 218. The second toothed gear 236B may be engaged with the second set of internal teeth 238B. Thus, when the first and second rotational motors 208A, 208B are activated, the toothed gears 236A, 236B may respectively apply a rotational force to the forward and rear auger elements 210, 212 via the internal teeth 238A, 238B.

Figure 6:
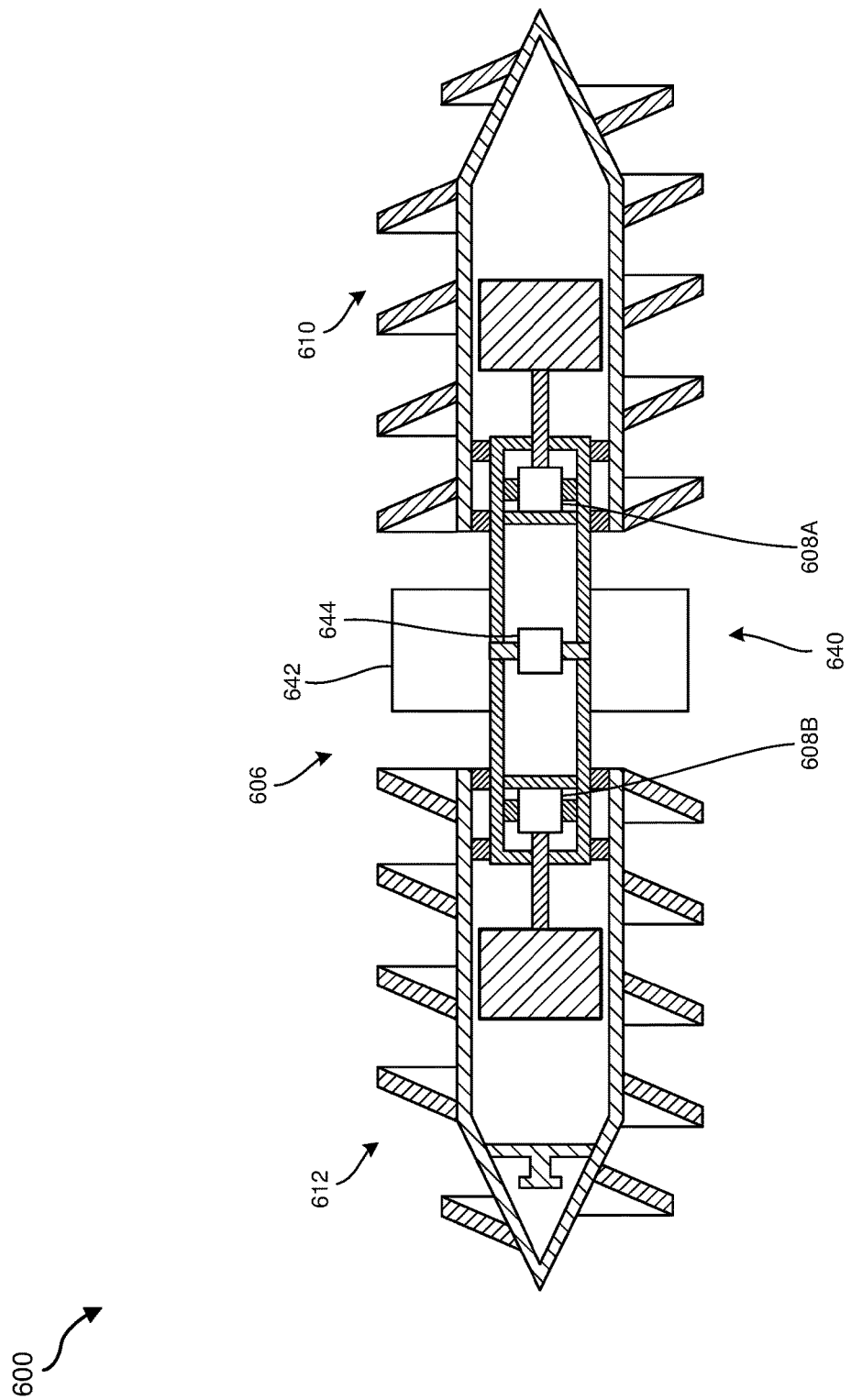
FIG. 6 is a cross-sectional side view of a system for laying underground fiber optic cable, according to at least one further embodiment of the present disclosure.

FIG. 6 is a cross-sectional side view of a system 600 for laying underground fiber optic cable, according to at least one further embodiment of the present disclosure. In some respects, the system 600 may be similar to the system 100 described above with reference to FIG. 1. For example, the system 600 may include a drive body 606 for housing a first rotational motor 608A and a second rotational motor 608B, a forward auger element 610 rotatably coupled to the drive body 606 and driven by the first rotational motor 608A, and a rear auger element 612 rotatably coupled to the drive body 606 and driven by the second rotational motor 608B.

As shown in FIG. 6, the system 600 may also include a steering mechanism 640 for orienting the system 600 as it proceeds through soil. For example, the steering mechanism 640 may include generally planar rectangular rudders 642 extending radially outward from opposing sides of the drive body 606. A steering motor 644 may be operatively coupled to the rudders 642 for turning the rudders 642 relative to the drive body 606 to steer the system 600 in a desired direction.

Figure 7:
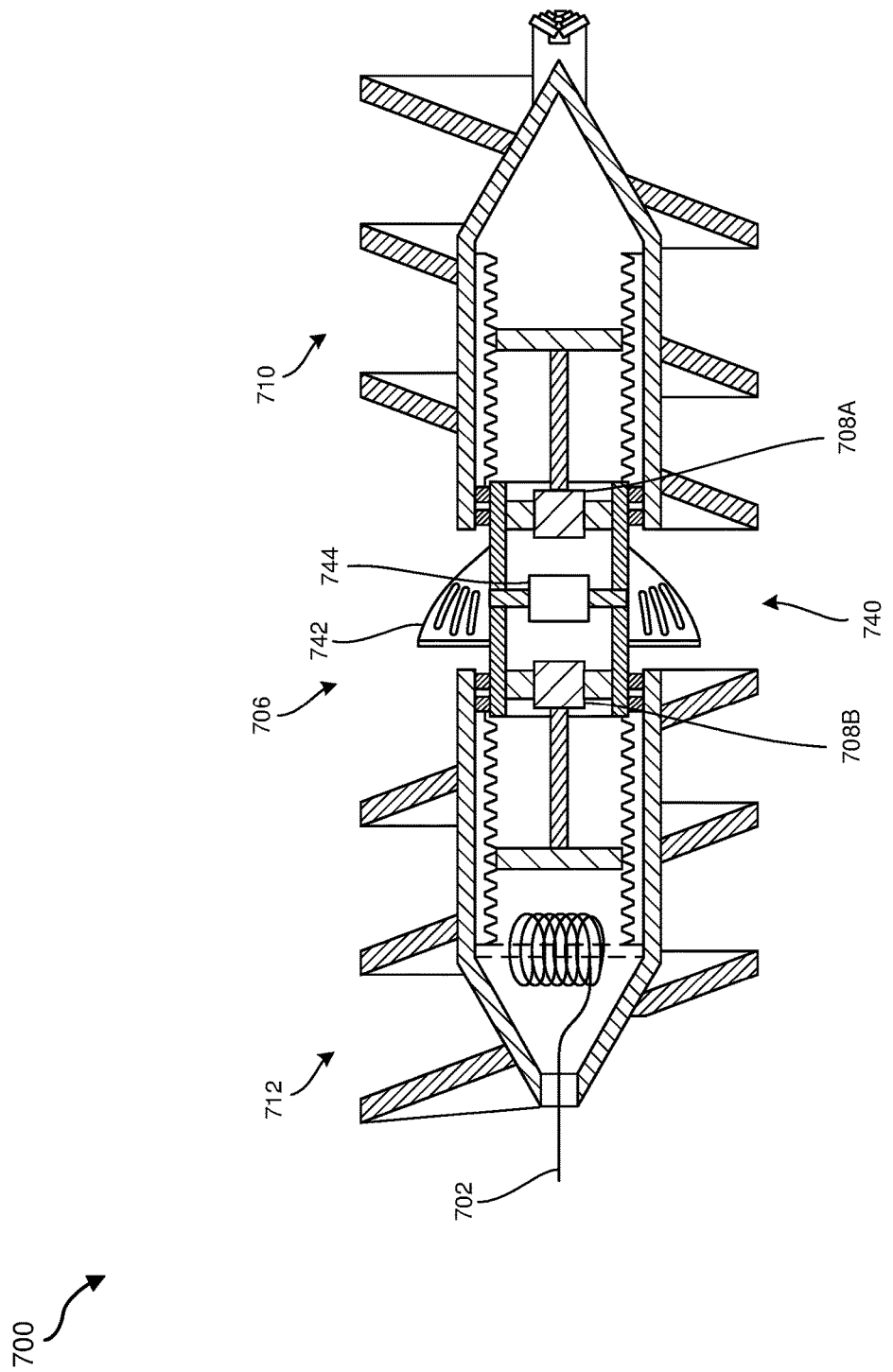
FIG. 7 is a cross-sectional side view of a system for laying underground fiber optic cable, according to at least one more embodiment of the present disclosure.

FIG. 7 is a cross-sectional side view of a system 700 for laying underground fiber optic cable 702, according to at least one more embodiment of the present disclosure. In some respects, the system 700 may be similar to the system 100 described above with reference to FIG. 1 and similar to the system 600 described above with reference to FIG. 6. For example, the system 700 may include a drive body 706 for housing a first rotational motor 708A and a second rotational motor 708B, a forward auger element 710 rotatably coupled to the drive body 706 and driven by the first rotational motor 708A, and a rear auger element 712 rotatably coupled to the drive body 706 and driven by the second rotational motor 708B.

The system 700 may also include a steering mechanism 740, which may include curved rudders 742 extending radially outward from the drive body 706. A steering motor 744 may be operatively coupled to the rudders 742 to turn the rudders 742 relative to the drive body 706. The curved shape of the rudders 742 may facilitate the rudders 742 cutting into soil as the system 700 progresses through soil, such as to avoid getting caught on rocks or other hard deposits.

Figure 8:
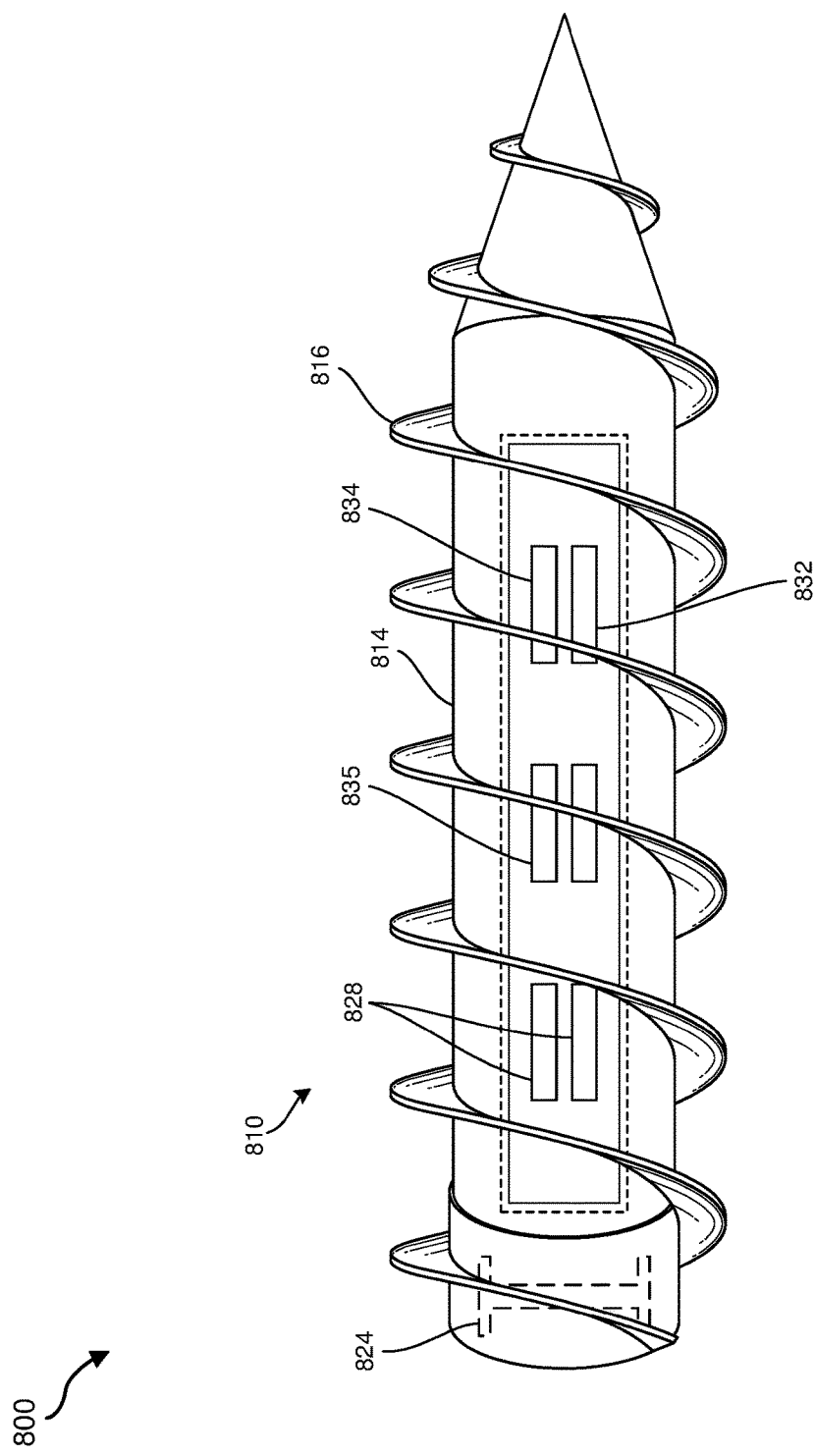
FIG. 8 is a side view of a system for laying underground fiber optic cable, according to at least one additional embodiment of the present disclosure.

FIG. 8 is a side view of a system 800 for laying underground fiber optic cable, according to at least one additional embodiment of the present disclosure. The system 800 may include an auger element 810 that may include a cylindrical body 814 and a helical fin 816 extending radially outward from the cylindrical body 814. A spool 824 may be employed to lay fiber optic cable and/or flexible conduit behind the system 800 as the system 800 proceeds through a subterranean formation (e.g., soil). Since the system 800 includes only one helical fin 816, the system 800 may be driven by a drill string or other rigid or semi-rigid pushing mechanism. The system 800 may include one or more electrical battery power sources 828, such as to power an object sensor 832, position sensor 834, orientation sensor 835, or any other electrical component on or in the system 800.

Figure 9:
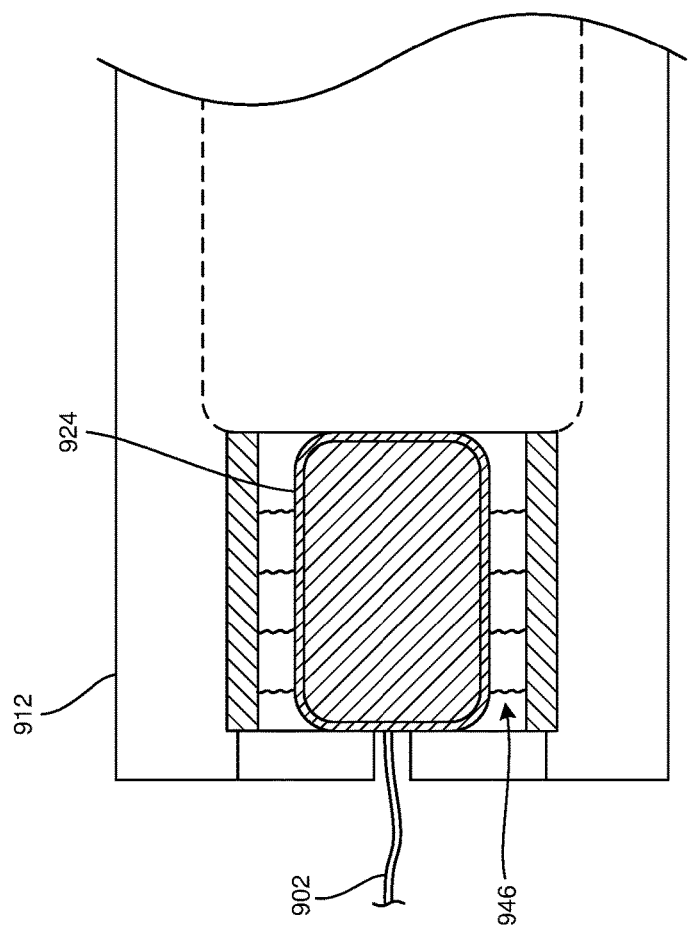
FIG. 9 is a cross-sectional side view of a spool section of a system for laying underground fiber optic cable, according to at least one embodiment of the present disclosure.

FIG. 9 is a cross-sectional side view of a spool 924 section of a system 900 for laying underground fiber optic cable 902, according to at least one embodiment of the present disclosure. The spool 924 may be supported by a rear cylindrical body 912 of the system 900. The spool 924 may be rotatable within and relative to the rear cylindrical body 912. For example, bearings 946 may be positioned between the spool 924 and an inner surface of the rear cylindrical body 912. The bearings 946 may enable the spool 924 to roll and/or slide relative to the inner surface of the rear cylindrical body 912. In some embodiments, the bearings 946 may also be configured to exhibit vibration dampening. For example, the bearings 946 may be or include a flexible (e.g., elastomeric) material to dampen vibration. The dampening of the vibration may reduce potential damage to the fiber optic cable 902.

The concepts relating to the spool 924 as described in relation to FIG. 9 may be applied to any of the systems 100, 200, 600, 700, 800 described above.

Figure 10:
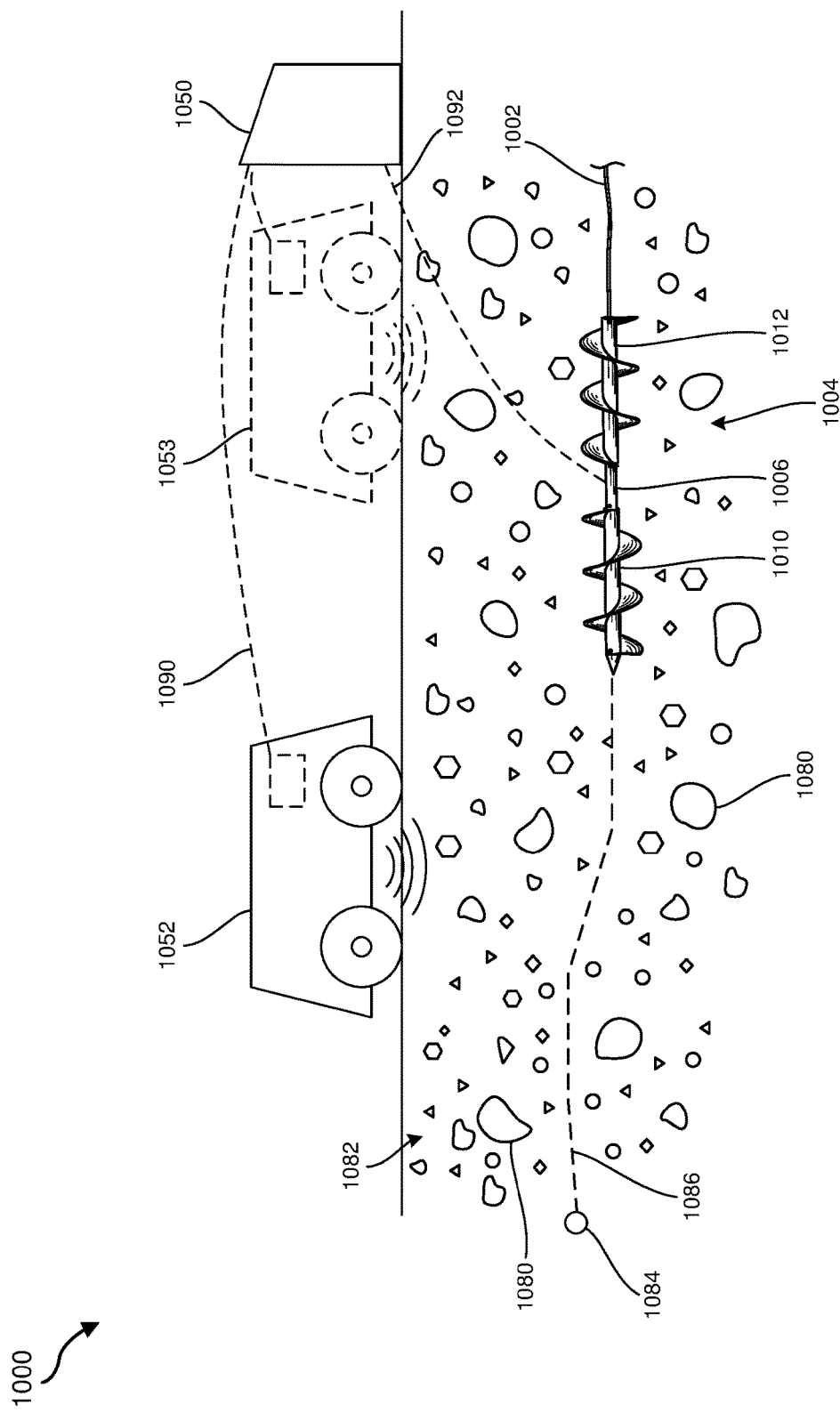
FIG. 10 is a side view of a system in use laying underground fiber optic cable, according to at least one embodiment of the present disclosure.
Figure 11:
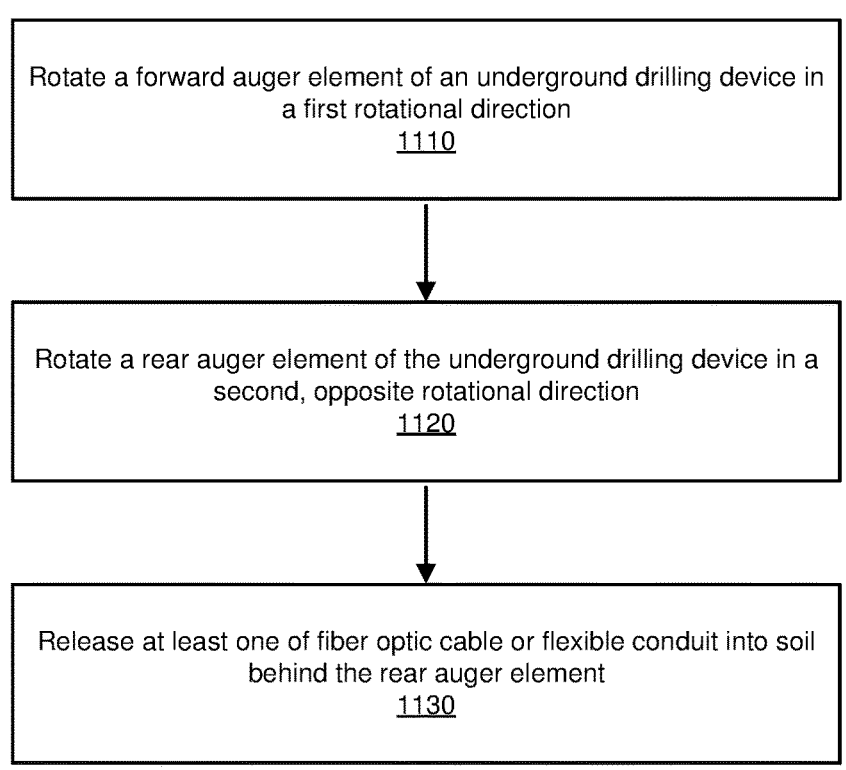
FIG. 11 is a flow diagram illustrating a method of laying underground fiber optic cable, according to at least one embodiment of the present disclosure.

FIG. 10 is a side view of a system 1000 in use laying underground fiber optic cable 1002, according to at least one embodiment of the present disclosure. The system 1000 may include an underground drilling device 1004, a remote operator 1050 for controlling the underground drilling device 1004, and at least one aboveground sensor device 1052 for sensing obstructions 1080 in soil 1082 in front of the underground drilling device 1004. The underground drilling device 1004 may be a device or system as described with reference to any of FIGS. 1-9. In some examples, the underground drilling device 1004 may include a drive body 1006, a forward auger element 1010, and a rear auger element 1012.

As explained above, the forward auger element 1010 may be positioned to be rotated in a first rotational direction (e.g., counterclockwise when viewed from a front of the underground drilling device 1004) and the rear auger element 1012 may be positioned to be rotated in a second, opposite rotational direction (e.g., clockwise when viewed from the front of the underground drilling device 1004) as the underground drilling device 1004 progresses through the soil 1082. The fiber optic cable 1002 may be held within the rear auger element 1012 and released into the soil 1080 as the underground drilling device 1004 moves forward (e.g., to the left as viewed from the perspective of FIG. 10).

The remote operator 1050 may include a computer (e.g., a laptop computer, a mobile device, a tablet computer, etc.), which may include a user interface for providing instructions to the underground drilling device 1004. In some embodiments, the remote operator 1050 may receive data from the aboveground sensor device 1052 indicative of a location of the obstructions 1080 in the soil 1082, such as via a wired or wireless connection 1090. The remote operator 1050 may use this data from the aboveground sensor device 1052 to automatically send instructions to a communications interface of the underground drilling device 1004 to steer away from the identified obstructions 1080 in the soil 1082, via another wired or wireless connection 1092. In the case of a wired connection, in some examples the remote operator 1050 may send digital instructions to the underground drilling device 1004 via the fiber optic cable 1002.

For example, a desired end point 1084 may be input into the remote operator 1050 when or before the underground drilling device 1004 is positioned underground to begin a drilling and fiber optic cable-laying operation. The aboveground sensor device 1052 may use a ground-penetrating object sensor (e.g., a gamma ray sensor, a sonar sensor, etc.) to sense the obstructions 1080 and to identify their location in the soil 1082. For example, the aboveground sensor device 1052 may automatically or manually move over a surface of the soil 1082 as the underground drilling device 1004 progresses. Optionally, one or more additional aboveground sensor devices 1053 may be positioned in different locations on the surface of the soil 1082. This configuration with multiple aboveground sensor devices 1052, 1053 may, in some embodiments, facilitate locating the obstructions 1080 by simultaneously using data from the object sensors on the various aboveground sensor devices 1052, 1053.

If an obstruction 1080 is identified in an initial proposed path of the underground drilling device 1004, the remote operator 1050 may instruct the underground drilling device 1004 to turn to avoid the obstruction 1080. This sensing and avoidance of obstructions 1080 may improve a drilling efficiency of the underground drilling device 1004, compared to other (e.g., conventional) systems that do not sense and avoid obstructions in soil.

As noted above with reference to FIG. 1, in some embodiments the underground drilling device 1004 may include an onboard object sensor. In these cases, the aboveground sensing device 1052 may be omitted from the system 1000. In additional embodiments, the aboveground sensing device(s) 1052, 1053 may scan an area of soil between a starting point to the input end point 1084 to identify the obstructions 1080 prior to the underground drilling device 1004 proceeding through the soil. Data corresponding the locations of the obstructions 1080 may be uploaded to the remote operator 1050 and/or directly to the underground drilling device 1004 for mapping a proposed path 1086 through the soil 1082. In some examples, the underground drilling device 1004 may autonomously (e.g., without further input from a human operator) proceed underground from a starting point to the input end point 1084.

FIG. 11 is a flow diagram illustrating a method 1100 of laying underground fiber optic cable, according to at least one embodiment of the present disclosure. At operation 1110, a forward auger element of an underground drilling device may be rotated in a first rotational direction. Operation 1110 may be performed in a variety of ways. For example, any of the example forward auger elements described above may be rotated in the first direction by a first rotational motor housed within a drive body of the underground drilling device. In some embodiments, the rotation of the forward auger element may be controlled by a remote operator.

At operation 1120, a rear auger element of the underground drilling device may be rotated in a second, opposite rotational direction. Operation 1120 may be performed in a variety of ways. For example, any of the example rear auger elements described above may be rotated in the second direction by a second rotational motor housed within the drive body, or by another output of the first rotational motor. In some embodiments, the rotation of the rear auger element may be controlled by the remote operator.

At operation 1130, at least one of fiber optic cable or flexible conduit may be released into soil behind the rear auger element. Operation 1130 may be performed in a variety of ways. For example, the rear auger element may house a spool for holding the fiber optic cable or flexible conduit. As the underground drilling device proceeds along a path underground, the fiber optic cable or flexible conduit may unwind from the spool to be deposited in the soil. In some examples, an inflatable flexible conduit may be released into the soil and may subsequently be inflated for insertion of fiber optic cable.

In some examples, at least one obstruction may be sensed in the soil in front of the forward auger element, such as by an object sensor in the underground drilling device and/or in an aboveground sensing device. The underground drilling device may be steered to avoid the obstruction, such as with a rudder as described with reference to FIGS. 6 and 7.

Accordingly, embodiments of the present disclosure include systems and methods that may enable relatively quick, inexpensive, and unobtrusive laying of underground fiber optic cables, compared to conventional systems. By sensing and avoiding obstructions, an underground drilling device used to lay the underground fiber optic cables may proceed more quickly through soil that is easier to drill through, compared to systems that may employ drilling without sensing and avoiding obstructions.

The following example embodiments are also included in the present disclosure.

Example 1: A system for laying underground fiber optic cable, which may include: a drive body; at least one rotational motor at least partially positioned within the drive body; a forward auger element rotatably coupled to the drive body and positioned to be rotated by the at least one rotational motor in a first rotational direction; and a rear auger element rotatably coupled to the drive body and positioned to be rotated by the at least one rotational motor in a second, opposite rotational direction.

Example 2: The system of Example 1, wherein the at least one rotational motor includes: a first rotational motor positioned to rotate the forward auger element in the first rotational direction; and a second rotational motor positioned to rotate the rear auger element in the second, opposite rotational direction.

Example 3: The system of Example 2, wherein the drive body includes a flexible junction positioned between the first rotational motor and the second rotational motor.

Example 4: The system of any of Examples 1 through 3, which may further include a steering mechanism configured to reorient a direction of underground movement of the system.

Example 5: The system of any of Examples 1 through 4, which may further include a subterranean drill bit positioned in front of the forward auger element.

Example 6: The system of any of Examples 1 through 5, which may further include an object sensor positioned and configured to sense obstructions in soil in front of the system.

Example 7: The system of Example 6, wherein the object sensor includes at least one of: a gamma ray sensor; or a sonar sensor.

Example 8: The system of any of Examples 1 through 7, which may further include a fiber spool mounted on or in the rear auger element, wherein the fiber spool is configured to release fiber optic cable behind the system as the system proceeds underground.

Example 9: The system of any of Examples 1 through 8, which may further include a battery power source positioned within at least one of: the drive body; the forward auger element; or the rear auger element.

Example 10: The system of any of Examples 1 through 9, which may further include a communication interface configured to enable electronic communication between the system and a remote operator.

Example 11: The system of any of Examples 1 through 10, which may further include at least one position and orientation sensor configured to determine a position and orientation of the system.

Example 12: The system of Example 11, wherein the system is configured to autonomously proceed underground from a starting point to an input end point.

Example 13: The system of any of Examples 1 through 12, which may further include a flexible conduit spool mounted on or in the rear auger element, wherein the flexible conduit spool is configured to release flexible conduit behind the system as the system proceeds underground.

Example 14: A system for laying underground fiber optic cable, which may include: an underground drilling device, including: a forward auger element positioned to be rotated in a first rotational direction; and a rear auger element positioned to be rotated in a second, opposite rotational direction; and an aboveground sensor device, including: a ground-penetrating object sensor configured to sense obstructions in soil in front of the underground drilling device, wherein the aboveground sensor device is in communication with the underground drilling device and the underground drilling device is configured to steer around obstructions identified by the aboveground sensor device.

Example 15: The system of Example 14, wherein the aboveground sensor device comprises a mobile vehicle configured to move over a surface of the soil.

Example 16: The system of Example 15, wherein the mobile vehicle comprises an unmanned mobile vehicle.

Example 17: The system of any of Examples 14 through 16, wherein the aboveground sensor device is in wired communication with the underground drilling device.

Example 18: A method of laying underground fiber optic cable, which may include: rotating a forward auger element of an underground drilling device in a first rotational direction; rotating a rear auger element of the underground drilling device in a second, opposite rotational direction; and releasing at least one of fiber optic cable or flexible conduit into soil behind the rear auger element.

Example 19: The method of Example 18, which may further include: sensing at least one obstruction in soil in front of the forward auger element; and steering the underground drilling device to avoid the obstruction.

Example 20: The method of Example 19, wherein the sensing of the at least one obstruction is performed by an object sensor on an aboveground sensor device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A system for laying underground fiber optic cable, the system comprising:
   a drive body;
   at least one rotational motor;
   a forward auger element rotatably coupled to the drive body and positioned to be rotated by the at least one rotational motor in a first rotational direction;
   a rear auger element rotatably coupled to the drive body and positioned to be rotated by the at least one rotational motor in a second, opposite rotational direction; and
   a steering mechanism comprising at least one rudder extending radially outward from the drive body, wherein the drive body is positioned centrally between the forward auger element and the rear auger element and the at least one rotational motor is positioned within the drive body.

2. The system of claim 1, wherein the at least one rotational motor comprises:
   a first rotational motor positioned to rotate the forward auger element in the first rotational direction; and
   a second rotational motor positioned to rotate the rear auger element in the second, opposite rotational direction.

3. The system of claim 2, wherein the drive body comprises a flexible junction positioned between the first rotational motor and the second rotational motor.

4. The system of claim 1, further comprising a steering mechanism configured to reorient a direction of underground movement of the system.

5. The system of claim 1, wherein the at least one rudder has at least one of the following shapes:
   planar rectangular; or
   curved.

6. The system of claim 1, further comprising an object sensor positioned and configured to sense obstructions in soil in front of the system.

7. The system of claim 6, wherein the object sensor comprises at least one of:
   a gamma ray sensor; or
   a sonar sensor.

8. The system of claim 1, further comprising a fiber spool mounted on or in the rear auger element, wherein the fiber spool is configured to release fiber optic cable behind the system as the system proceeds underground.

9. The system of claim 1, further comprising a battery power source positioned within at least one of:
   the drive body;
   the forward auger element; or
   the rear auger element.

10. The system of claim 1, further comprising a communication interface configured to enable electronic communication between the system and a remote operator.

11. The system of claim 1, further comprising at least one position and orientation sensor configured to determine a position and orientation of the system.

12. The system of claim 11, wherein the system is configured to autonomously proceed underground from a starting point to an input end point.

13. The system of claim 1, further comprising a flexible conduit spool mounted on or in the rear auger element, wherein the flexible conduit spool is configured to release inflatable flexible conduit behind the system as the system proceeds underground.

14. A system for laying underground fiber optic cable, the system comprising:
   an underground drilling device, comprising:
      a central drive body housing at least one motor;
      a forward auger element positioned to be rotated by the at least one motor in a first rotational direction relative to the central drive body;
      a rear auger element positioned to be rotated by the at least one motor in a second, opposite rotational direction relative to the central drive body; and
      a steering mechanism comprising at least one rudder extending radially outward from the drive body; and
   an aboveground sensor device, comprising:
      a ground-penetrating object sensor configured to sense obstructions in soil in front of the underground drilling device,
   wherein the aboveground sensor device is in communication with the underground drilling device and the underground drilling device is configured to steer around obstructions identified by the aboveground sensor device.

15. The system of claim 14, wherein the aboveground sensor device comprises a mobile vehicle configured to move over a surface of the soil.

16. The system of claim 15, wherein the mobile vehicle comprises an unmanned mobile vehicle.

17. The system of claim 14, wherein the aboveground sensor device is in wired communication with the underground drilling device.

18. A method of laying underground fiber optic cable, the method comprising:
   rotating, with at least one motor positioned within a central drive body, a forward auger element of an underground drilling device in a first rotational direction relative to the central drive body;
   rotating, with the at least one motor positioned within a central drive body, a rear auger element of the underground drilling device in a second, opposite rotational direction relative to the central drive body;
   steering the underground drilling device with at least one rudder extending radially outward from the central drive body; and
   releasing at least one of fiber optic cable or flexible conduit into soil behind the rear auger element.

19. The method of claim 18, further comprising:
   sensing at least one obstruction in soil in front of the forward auger element.

20. The method of claim 19, wherein the sensing of the at least one obstruction is performed by an object sensor on an aboveground sensor device.

* * * * *